US011643991B2

(12) United States Patent
Donahue et al.

(10) Patent No.: US 11,643,991 B2
(45) Date of Patent: *May 9, 2023

(54) ANNULAR RING GROOVE OF A PISTON (71) Applicant: AI ALPINE US BIDCO INC, Wilmington, DE (US)

(72) Inventors: Richard John Donahue, West Bend, WI (US); James Richard Zurlo, Waukesha, WI (US)

(73) Assignee: AI ALPINE US BIDCO INC, Wilmington, DE (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/931,298

(22) Filed: Jul. 16, 2020

(65) Prior Publication Data
US 2020/0347798 A1 Nov. 5, 2020

Related U.S. Application Data (63) Continuation of application No. 14/867,231, filed on Sep. 28, 2015, now Pat. No. 10,753,312.

(51) Int. Cl.
F02F 3/24 (2006.01)
F16J 1/00 (2006.01)
F16J 9/22 (2006.01)
F02F 3/00 (2006.01)
F02F 3/02 (2006.01)

(52) U.S. Cl.
CPC .................. F02F 3/24 (2013.01); F16J 1/00 (2013.01); F16J 1/001 (2013.01); F16J 9/22 (2013.01); F02F 3/00 (2013.01); F02F 3/02 (2013.01)

(58) Field of Classification Search
CPC ...... F02F 3/02; F02F 3/045; F02F 3/08; F02F 3/12; F02F 3/24; F02F 5/00; F16J 9/22; F16J 9/24; F16J 1/001
See application file for complete search history.

(56) References Cited

U.S. PATENT DOCUMENTS

| 1,767,164 | A | | 6/1930 | Ahern et al. | |
| 2,294,519 | A | | 9/1942 | Starr | |
| 4,384,554 | A | | 5/1983 | Gotoda | |
| 5,083,536 | A | * | 1/1992 | Ariga | F16J 9/08 123/193.6 |
| 5,303,683 | A | * | 4/1994 | Wittwer | F16J 9/22 123/193.6 |

(Continued)

FOREIGN PATENT DOCUMENTS

EP 2952787 A1 12/2015

OTHER PUBLICATIONS

PCT International Search Report and Written Opinion; Application No. PCT/US2016/052213; dated Jan. 25, 2017; 13 pages.

Primary Examiner — Grant Moubry
Assistant Examiner — Ruben Picon-Feliciano
(74) Attorney, Agent, or Firm — Fletcher Yoder, P.C.

(57) ABSTRACT

A power cylinder system for a reciprocating engine includes a piston configured to move within a cylinder of the reciprocating engine. The system also includes a groove extending circumferentially about the piston and configured to support a ring. An axially-facing surface of the groove has circumferential undulations at ambient temperatures that are configured to compensate for distortions to the groove caused by operation of the reciprocating engine.

20 Claims, 7 Drawing Sheets (56) References Cited

U.S. PATENT DOCUMENTS

| | | | |
|---|---|---|---|
| 5,676,380 | A | 10/1997 | Sell |
| 5,782,217 | A | 7/1998 | Ito et al. |
| 6,457,721 | B1 | 10/2002 | Bloemers et al. |
| 10,753,312 | B2 * | 8/2020 | Donahue .................. F02F 3/24 |
| 2009/0050101 | A1 | 2/2009 | Taylor et al. |
| 2014/0090625 | A1 | 4/2014 | Dion et al. |
| 2015/0354496 | A1 | 12/2015 | Donahue |

* cited by examiner

FIG. 10

ANNULAR RING GROOVE OF A PISTON

CROSS-REFERENCE TO RELATED APPLICATION

This application is a continuation of U.S. patent application Ser. No. 14/867,231, entitled "AN ANNULAR RING GROOVE OF A PISTON" and filed on Sep. 28, 2015, which is hereby incorporated by reference in its entirety.

BACKGROUND OF THE INVENTION

The subject matter disclosed herein relates generally to reciprocating engines, and, more particularly to distortion compensation for a groove of a piston of a reciprocating engine.

A reciprocating engine (e.g., a reciprocating internal combustion engine) combusts fuel with an oxidant (e.g., air) to generate hot combustion gases, which in turn drive a piston (e.g., a reciprocating piston) within a cylinder. In particular, the hot combustion gases expand and exert a pressure against the piston that linearly moves the piston from a top portion to a bottom portion of the cylinder during an expansion stroke. The piston converts the pressure exerted by the combustion gases and the piston's linear motion into a rotating motion (e.g., via a connecting rod and a crankshaft coupled to the piston) that drives one or more loads, e.g., an electrical generator. The construction of the piston and associated structures (e.g., a piston assembly) can significantly impact exhaust emissions (e.g., unburned hydrocarbons) and engine efficiency, as well as lubricant (e.g., oil) consumption. Furthermore, the construction of the piston assembly can significantly affect the operating life of the reciprocating engine. Therefore, it would be desirable to improve the construction of the piston assembly.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a power cylinder system for a reciprocating engine includes a piston configured to move within a cylinder of the reciprocating engine. The system also includes a groove extending circumferentially about the piston and configured to support a ring. An axially-facing surface of the groove has circumferential undulations at ambient temperatures that are configured to compensate for distortions to the groove caused by operation of the reciprocating engine.

In one embodiment, a power cylinder system for a reciprocating engine includes a piston configured to move within a cylinder of the reciprocating engine. The system also includes a groove extending circumferentially about the piston and configured to support a ring. A first distance between a first axially-facing surface of the groove and a top-most surface of the piston varies circumferentially about the piston at ambient temperatures to compensate for distortions to the groove caused by operation of the reciprocating engine.

In one embodiment, a method of manufacturing a piston for a power cylinder system of a reciprocating engine includes determining expected axial distortions about a circumference of a groove of the piston during operation of the reciprocating engine. The method also includes determining appropriate machining parameters to compensate for the expected axial distortions. The method further includes controlling a tool to form the groove of the piston according to the appropriate machining parameters such that an axial-facing surface of the groove comprises circumferential undulations at ambient temperatures that are configured to compensate for the expected axial distortions about the circumference of the groove during operation of the reciprocating engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Power cylinder systems for reciprocating engines (e.g., reciprocating internal combustion engines) in accordance with the present disclosure may include one or more pistons each configured to move linearly within a cylinder (e.g., a liner) to convert pressure exerted by combustion gases and the piston's linear motion into a rotating motion to power one or more loads. Each piston may have a top annular groove (e.g., a top ring groove or a top-most ring groove) extending circumferentially about the piston beneath a top land of a piston. A top ring (e.g., a top piston ring or a top-most ring) may be disposed within the top groove. The top ring may be configured to contact an inner wall of the cylinder to block fuel and air, or a fuel-air mixture, from escaping from a combustion chamber and/or to facilitate maintenance of suitable pressure to enable expanding hot combustion gases to cause the reciprocating motion of the piston. In some embodiments, one or more additional annular grooves (e.g., additional ring grooves or additional compression ring grooves) may extend circumferentially about the piston, and one or more additional rings (e.g., additional rings or additional compression rings) may be disposed within the one or more additional ring grooves. In such cases, the top ring and/or the additional rings form a ring pack and may generally control flow of combustion gases and/or lubricant (e.g., oil) within the engine.

During operation of the reciprocating engine, fuel and air combust in a combustion chamber, causing the piston to move within the cylinder. In some cases, the top annular groove may be unevenly distorted about a circumference of the piston during operation of the reciprocating engine due to variations in temperature about the piston, for example. Thus, one portion of the top annular groove located at a first circumferential position of the piston may deform more than another portion of the top annular groove located at a second circumferential position of the piston. Without the disclosed embodiments, an axially-facing surface (e.g., a top annular surface and/or a bottom annular surface) of the top annular groove may not be substantially flat about a circumference of the piston during operation of the reciprocating engine. As a result, the top annular groove may not adequately support to the top ring during operation of the reciprocating engine. In some such cases, contact between the top ring and the inner wall of the cylinder may be adversely affected, and the top ring may not effectively block blowby of unburned hydrocarbons, for example. With the forgoing in mind, present embodiments include a piston having a top annular groove configured to compensate for such distortions and to provide substantially flat and/or relatively flat surfaces (e.g., as compared to pistons without the disclosed compensation) to support the top ring during operation of the reciprocating engine. For example, the top annular groove may be machined at manufacturing to compensate for distortions that may occur during operation of the reciprocating engine (e.g., the top annular groove may be configured to have features (e.g., compensation features or undulations) that extend opposite to expected distortions. The embodiments disclosed herein may facilitate contact between the top ring and the inner wall of the cylinder, and therefore, may reduce blowby of unburned hydrocarbons, oil consumption, and/or emissions, for example.

Figure 1:
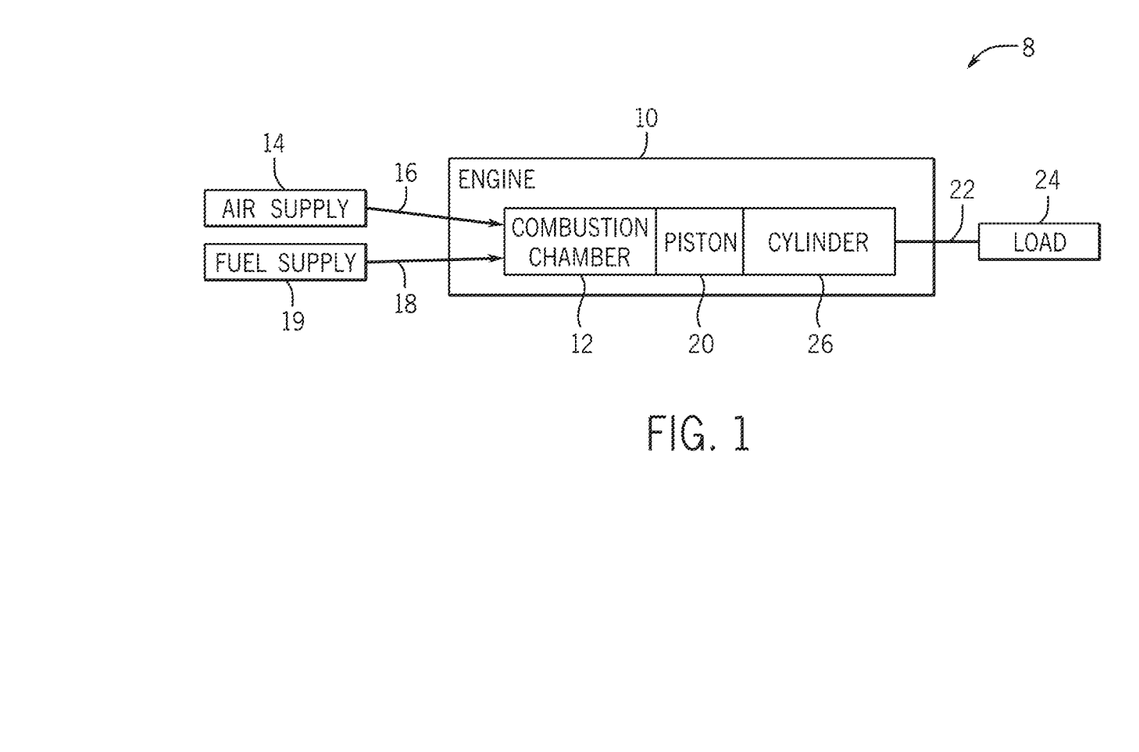
FIG. 1 is a schematic block diagram of an embodiment of a portion of a reciprocating engine system.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 14. The combustion chamber 14 is also configured to receive a fuel 18 (e.g., a liquid and/or gaseous fuel) from a fuel supply 19, and a fuel-air mixture ignites and combusts within each combustion chamber 14. The hot pressurized combustion gases cause a piston 20 adjacent to each combustion chamber 14 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable liquid fuel, such as diesel or gasoline, or any suitable gaseous fuel, such as natural gas, associated petroleum gas, propane, biogas, sewage gas, landfill gas, or coal mine gas, for example.

The system 8 disclosed herein may be adapted for use in stationary applications (e.g., in industrial power generating engines) or in mobile applications (e.g., in cars or aircraft), although the system 8 may be particularly useful for controlling the flow of combustion gases and oil in large industrial power generating engines. The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-50 cm, 15-30 cm, or 15-20 cm. In some embodiments, the cylinders and/or the pistons 20 may have a diameter greater than approximately 10 cm, 15 cm, 20 cm, 25 cm, 30 cm, 35 cm, or 40 cm. The system 8 may generate power ranging from 10 kilowatts (kW) to 10 Megawatts (MW). In some embodiments, the engine 10 may be configured to operate at a maximum revolutions per minute (RPM) of approximately 1800 RPM. In some embodiments, the engine 10 may be configured to operate at a maximum of approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. Furthermore, in some embodiments, the piston 20 may have a generally low maximum mean piston speed (e.g., relative to automobile engines or the like). For example, the piston 20 may have a maximum mean piston speed of less than 25 meters per second (m/s), 20 m/s, 19 m/s, 18 m/s, 17 m/s, 16 m/s, 15 m/s, 14 m/s, 13 m/s, 12 m/s, 11 m/s, 10 m/s, 9 m/s, 8 m/s, 7 m/s, 6 m/s, or 5 m/s. In some embodiments, the piston 20 may have a maximum mean piston speed of between approximately 1 to 25 m/s, 5 to 20 m/s, 10 to 20 m/s, 10 to 16 m/s, 13 to 15 m/s, or 11 to 12 m/s. In some embodiments, the piston 20 may have a maximum mean piston speed of approximately 12 m/s. The mean piston speed is an average speed of the piston 20 in the engine 10 and is a function of stroke and RPM. For example, the mean piston speed (MPS) may be equal to (2×S)×(RPM/60), where S is the stroke (e.g., a length of the stroke) and RPM is the revolutions per minute at which the engine 10 operates. In the above equation, the stroke is multiplied by a factor of 2 to account for the fact that two strokes occur per one crank revolution, and the RPM may be divided by a factor of 60 to convert minutes to seconds. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example. The piston 20 may be a steel piston or an aluminum piston. In certain embodiments, the piston 20 may include a protective ring insert (e.g., a Ni-resist ring insert) in a ring groove of the piston 20. As discussed in detail below, one or more of the ring grooves, such as a top annular ring groove, of the piston 20 may be configured to compensate for distortions that may occur during operation of the engine 10.

Figure 2:
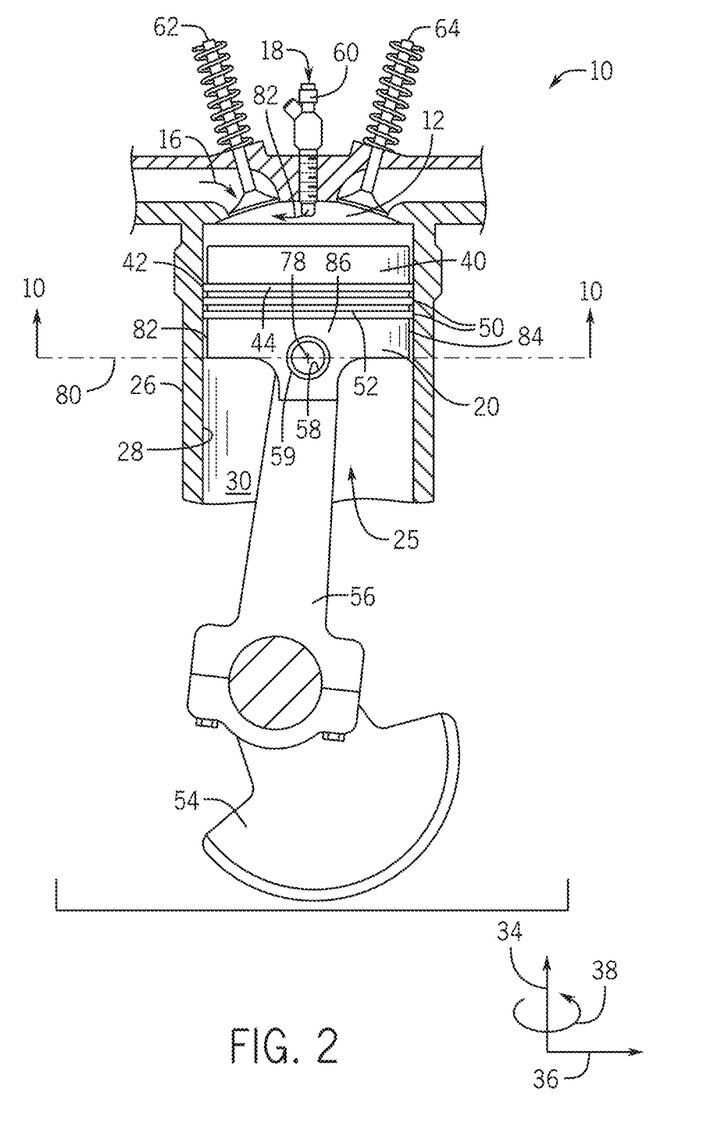
FIG. 2 is a cross-sectional side view of an embodiment of a piston-cylinder assembly having a piston positioned within a cylinder that may be used in the reciprocating engine system of FIG. 1.

FIG. 2 is a side cross-sectional view of an embodiment of a piston assembly 25 having the piston 20 disposed within the cylinder 26 (e.g., engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., top land) and a top annular groove 42 (e.g., top groove or top-most groove) extending circumferentially (e.g., in the circumferential direction 38) about the piston 20. A top ring 44 (e.g., a top piston ring) may be positioned in the top groove 42.

The top ring 44 is configured to protrude radially outward from the top groove 42 to contact the inner annular wall 28 of the cylinder 26. The top ring 44 generally blocks the fuel 18 and the air 16, or a fuel-air mixture 82, from escaping from the combustion chamber 12 and/or facilitates maintenance of suitable pressure to enable the expanding hot combustion gases to cause the reciprocating motion of the piston 20. Furthermore, the top ring 44 of the present embodiments may be configured to facilitate scraping of oil, which coats the inner annular wall 28 and which controls heat and/or friction within the engine 10, for example.

In some embodiments, one or more additional annular grooves 50 (e.g., additional grooves) may extend circumferentially about the piston 20 axially below the top groove 42. In some embodiments, one or more additional rings 52 (e.g., additional rings) may be disposed within each of the one or more additional grooves 50. The additional rings 52 may be configured to block blowby and/or to scrape oil from the inner annular wall 28 of the cylinder 26.

As shown, the piston 20 is attached to a crankshaft 54 via a connecting rod 56 and a pin 58, which is positioned in a pinhole 59. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 14 is positioned adjacent to the top land 40 of the piston 24. A fuel injector 60 provides the fuel 18 to the combustion chamber 14, and a valve 62 controls the delivery of air 16 to the combustion chamber 14. An exhaust valve 64 controls discharge of exhaust from the engine 10. However, it should be understood that any suitable elements and/or techniques for providing fuel 18 and air 16 to the combustion chamber 14 and/or for discharging exhaust may be utilized. In operation, combustion of the fuel 18 with the air 16 in the combustion chamber 14 cause the piston 20 to move in a reciprocating manner (e.g., back and forth) in the axial direction 34 within the cavity 30 of the cylinder 26.

As shown, the piston 20 has a pin axis 78 oriented within an axially extending piston pin plane and a thrust axis 80 oriented within an axially extending piston thrust plane. The pin axis 78 and the thrust axis 80, as well as the respective planes, are orthogonal to one another. Furthermore, the piston 20 has a major thrust side 82, a minor thrust side 84, a first pin side 86, and a second pin side positioned at circumferential locations about the piston 20. In particular, the major thrust side 82 and the minor thrust side 84 are located along the thrust axis 80 on opposite sides of the piston 20 (e.g., offset from one another by 180 degrees about the piston 20). The first pin side 86 and the second pin side are located along the pin axis 78 on opposite sides of the piston 20 (e.g., offset from one another by 180 degrees about the piston 20, and offset from the major thrust side 82 and the minor thrust side 84 by 90 degrees). During operation of the reciprocating engine 10, the piston 20 may move axially (e.g., along the axial axis 34) and shift laterally (e.g., along the thrust axis 80) within the cylinder 26.

As noted above, during operation of the reciprocating engine 10, the top groove 42 may distort unevenly about the circumference of the piston 20. To facilitate discussion, distortion compensation is discussed in the context of the top groove 42; however, it should be understood that the disclosed embodiments may be adapted for the one or more additional grooves 52. For example, the top groove 42 and/or the one or more additional grooves 52 may include distortion compensation features. Additionally, the present disclosure provides certain examples of compensating features, distortions, and/or temperature variations with reference to the major thrust side 82, the minor thrust side 84, the first pin side 86, and the second pin side of the piston 20. However, the disclosed embodiments may demonstrate any of a variety of compensating features and may be adapted for use with pistons 20 and engines 10 demonstrating any of a variety of distortion patterns and/or temperature variation patterns.

Figure 3:
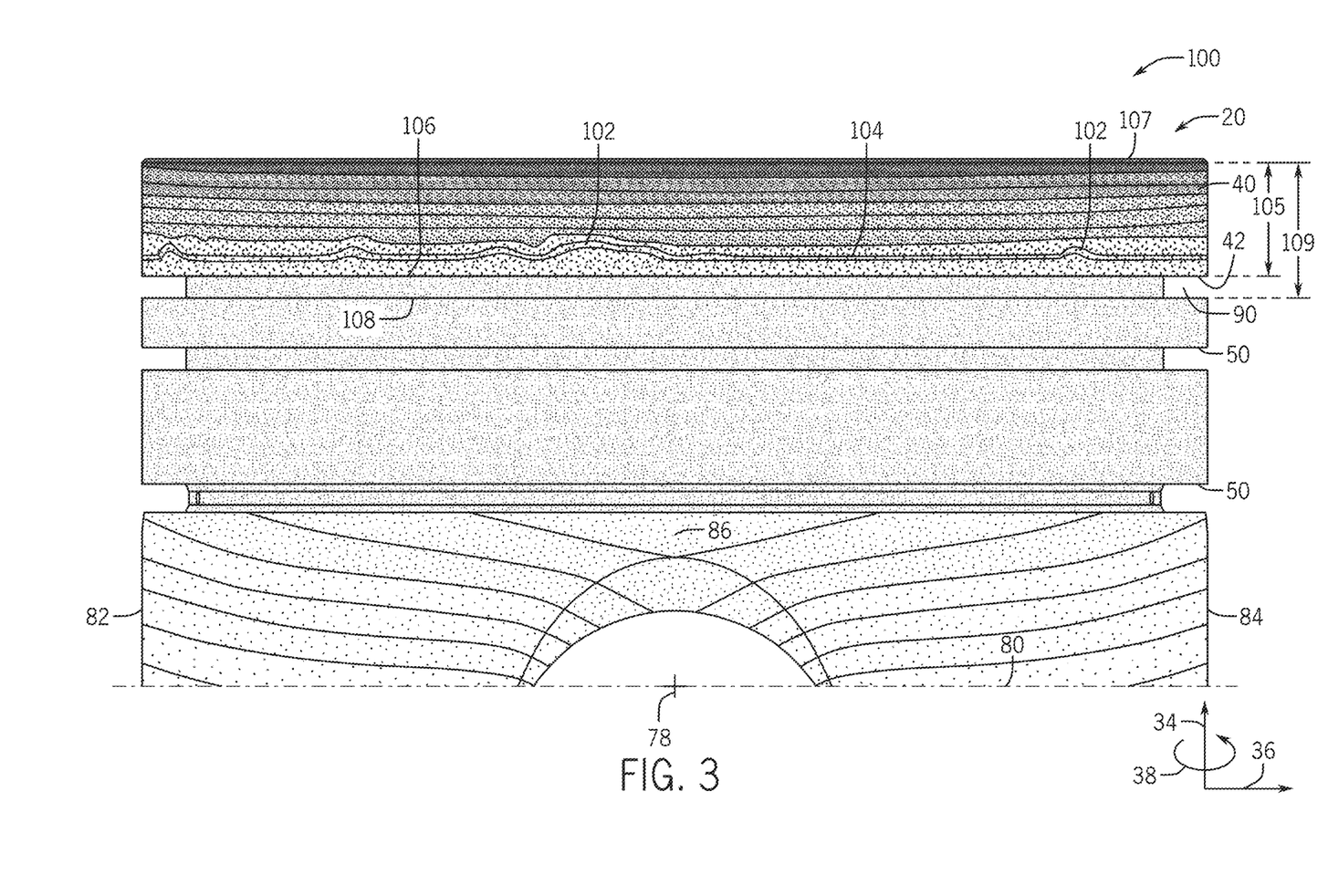
FIG. 3 is an example of a map of a temperature distribution about a piston during operation of the reciprocating engine system of FIG. 1.

FIG. 3 is an example of a map 100 of a temperature distribution about a portion of the piston 20 during operation of the engine 10. As noted above, the temperature may vary circumferentially about the piston 20 and about the top groove 42 and may cause or contribute to uneven distortion of the top groove 42 about the circumference of the piston 20. As shown in the representative map 100, certain portions 104 of the top land 40 (e.g., at a first circumferential location) may demonstrate higher temperatures than other portions 102 (e.g., at a second circumferential location). Such temperature variations may cause the top groove 42 to be unevenly distorted about a circumference of the piston 20 during operation of the engine 10. For example, such temperature variations may cause axially distortions in which an axially-facing surface (e.g., a top annular surface 106 and/or a bottom annular surface 108) of the top groove 42 undulate about the circumference of the piston 20 during operation of the engine 10. In some cases, such temperature variations may cause the top groove 42 to tilt (e.g., a centerline 90 of the top groove 42 may tilt at an angle relative to the radial axis 36) about the circumference of the piston 20. In some cases, such temperature variations may cause the top groove 42 to tilt at certain discrete locations and/or to varying degrees about the circumference of the piston 20.

In the present embodiments, the top groove 42 is configured to compensate for various expected distortions (e.g., axial distortions, tilt, or the like) that may occur during operation of the engine 10. In certain embodiments, the top groove 42 may be manufactured to have a geometry that compensates or accounts for the expected distortions. For example, in some embodiments, the top groove 42 is manufactured such that the top annular surface 106 and/or the bottom annular surface 108 have circumferential undulations (e.g., undulations, a wave pattern, or oscillations extending circumferentially about the piston 20) at ambient temperatures to compensate (e.g., counteract or offset) for the expected distortions. In some embodiments, a first axial distance 105 between the top annular surface 106 and a top surface 107 (e.g., a top-most surface or upper surface) of the top land 40 may vary about the circumference of the piston 20 and/or a second axial distance 109 between the bottom annular surface 108 and the top surface 107 of the top land 40 may vary about the circumference of the piston 20 at ambient temperatures. In some embodiments, the first axial distance 107 and/or the second axial distance 109 may respectively vary by more than 0.1, 0.5, 1, 2, 3, 4, 5, 6, 7, 8, 9, or 10 percent at ambient temperatures. In some embodiments, the top groove 42 may be configured to provide a substantially flat top annular surface 106 and/or a substantially flat bottom annular surface 108 (e.g., less than 15, 10, 5, 4, 3, 2, or 1 percent axial variation about the circumference of the piston 20 and/or less than about 10, 20, 30, 40, 50, 60, 70, or 80 microns axial variation about the circumference of the piston 20) during operation of the reciprocating engine 10 (e.g., at idle, at a rated load, or at a specified percentage of the rated load). Such compensation may enable the top groove 42 to adequately support the top ring 44 during operation of the engine 10, and may facilitate contact between the top ring 44 and the inner wall 28 of the cylinder 26, thereby blocking blowby of unburned hydrocarbons.

Figure 4:
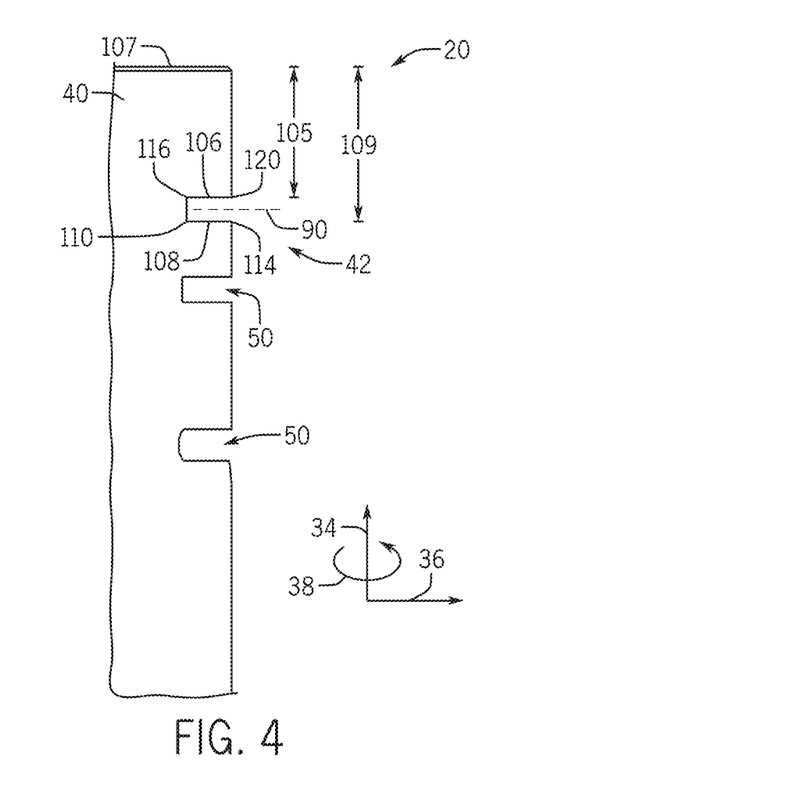
FIG. 4 is a cross-sectional side view of a portion of an embodiment of a piston that may be used in the reciprocating engine system of FIG. 1.
Figure 5:
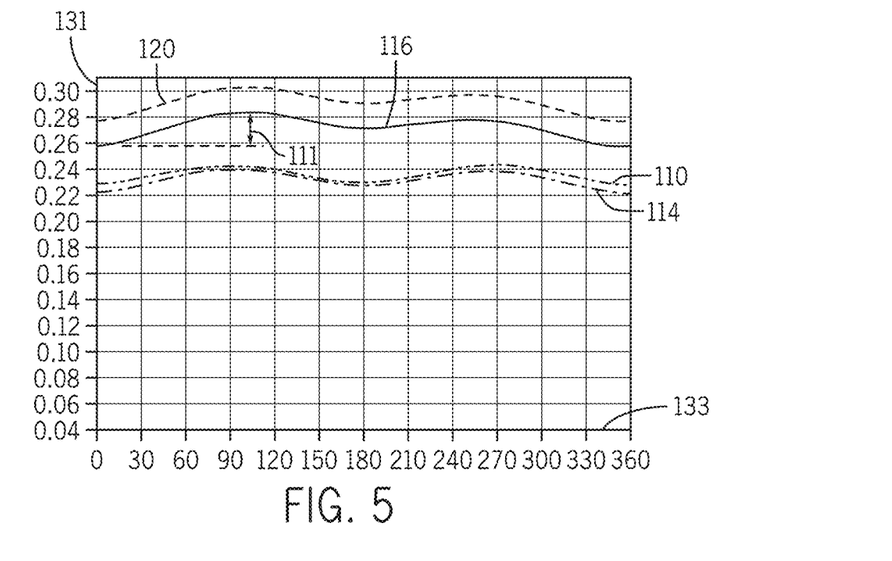
FIG. 5 is a schematic side view of a top annular groove of a piston that may be used in the reciprocating engine system of FIG. 1.

FIG. 4 is a cross-sectional side view of a portion of an embodiment of the piston 20. As shown, the top groove 42 may be defined by a radially-inner edge 110 of the bottom annular surface 108 of the top groove 42, a radially-outer edge 114 of the bottom annular surface 108, a radially-inner edge 116 of the top annular surface 106, and a radially-outer edge 120 of the top annular surface 106. FIG. 5 is a schematic side view of an embodiment of the top groove 42 that is configured to compensate for various distortions that may occur during operation of the engine 10. In particular, a y-axis 131 represents an axial location of the piston 20, and a x-axis 133 represents circumferential locations about the piston 20. In the schematic, 0 degrees corresponds to the major thrust side 82, 90 degrees corresponds to the first pin side 86, 180 degrees corresponds to the minor thrust side 84, and 270 degrees corresponds to the second pin side. The radially-inner edge 110 and the radially-outer edge 114 define the bottom annular surface 108, and the radially-inner edge 116 and the radially-outer edge 120 define the top annular surface 106.

As shown, the axial position 131 of the bottom annular surface 108 and/or the top annular surface 106 of the top groove 42 may vary (e.g., undulate, oscillate, follow a wave pattern) about the circumference (e.g., circumferential locations 133) of the piston 20 at ambient temperatures. As discussed above with respect to FIG. 3, the first axial distance 105 between the top annular surface 106 (or between the radially-inner edge 116 and/or the radially-outer edge 120) and the top surface 107 of the top land 40 may vary about the circumference of the piston 20 and/or the second axial distance 109 between the bottom annular surface 108 (or between the radially-inner edge 110 and/or the radially-outer edge 114) and the top surface 107 of the top land 40 may vary about the circumference of the piston 20 at ambient temperatures. In some embodiments, the first axial distance 105 and/or the second axial distance 109 may respectively vary by more than 0.1, 0.5, 1, 2, 3, 4, 5, 6, 7, 8, 9, or 10 percent about the circumference of the piston 20 at ambient temperatures and/or by more than about 10, 20, 30, 40, 50, 60, 70, or 80 microns about the circumference of the piston 20. In the illustrated embodiment, the first axial distance 105 and/or the second axial distance 109 are less (e.g., at least 0.1, 0.5, 1, 2, 3, 4, 5, or 10 percent less) at the first pin side 86 and the second pin side than at the major thrust side 82 and the minor thrust side 84 at ambient temperatures. Although in other embodiments, the first and second axial distances 105, 109 may be greater (e.g., at least 0.1, 0.5, 1, 2, 3, 4, 5, or 10 percent greater) at first pin side 86 and the second pin side than at the major thrust side 82 and the minor thrust side 84 at ambient temperatures. In certain embodiments, the top annular surface 106 and/or the bottom annular surface 108 may have any suitable geometry about the circumference of the piston 20 to compensate for the expected distortions during operation of the engine 10 such that the top annular surface 106 and/or the bottom annular surface 108 are substantially flat during operation of the engine 10.

As noted above, the top groove 42 may tilt (e.g., the centerline 90 of the top groove 42 may tilt at an angle relative to the radial axis 36) at certain locations about the circumference of the piston 20 during operation of the engine 10. Accordingly, in some embodiments, the top annular surface 106 and/or the bottom annular surface 108 may be tilted (e.g., radially inclined from the radially inner edges 110, 116 to respective radially outer edges 114, 120) such that the centerline 90 tilts relative to the radial axis 36 at ambient temperatures to compensate for expected tilt (e.g., distortions that cause the top annular surface 106 and/or the bottom annular surface 108 to radially decline from the radially inner edges 110, 116 to respective radially outer edges 114, 120) during operation of the engine 10. An example of the tilted top annular surface 106 and/or the bottom annular surface 108 at ambient temperatures is illustrated in the schematic of FIG. 5.

Figure 6:
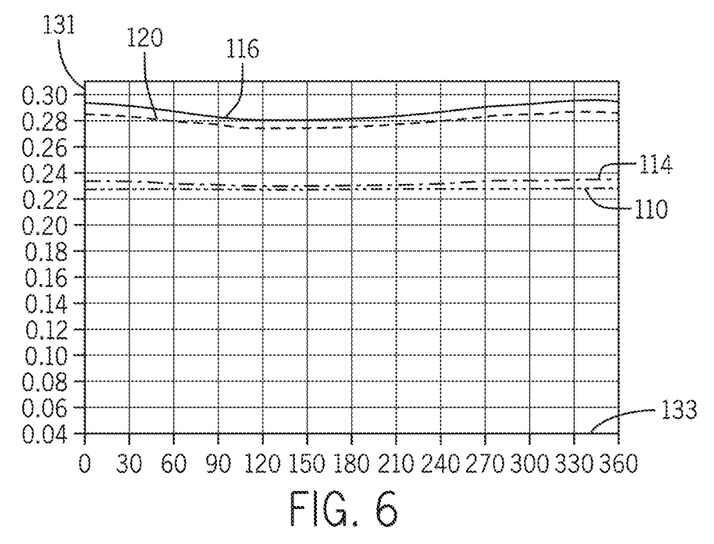
FIG. 6 is a schematic side view of the top annular groove of FIG. 5 during operation of the reciprocating engine system.

FIG. 6 is a schematic side view of an embodiment of the top groove 42 during operation of the engine 10. As noted above, during operation of the engine 10, portions the top groove 42 may be unevenly distorted about the circumference of the piston 20. The geometry of the top groove 42, such as the geometry discussed above with respect to FIG. 5, may be configured to compensate for the expected distortions such that the bottom annular surface 108 and/or the top annular surface 106 are substantially flat during operation of the reciprocating engine 10 (e.g., at idle, at a rated load, or at a designated percentage of the rated load). As shown in FIG. 6, the top groove 42 may be configured to provide a substantially flat top annular surface 106 and/or a substantially flat bottom annular surface 108 (e.g., less than 15, 10, 5, 4, 3, 2, 1, 0.5, 0.1 percent axial variation about the circumference of the piston 20) during operation of the engine 10. In some embodiments, one or more of the respective edges 110, 114, 116, 120 may be substantially flat (e.g., less than 15, 10, 5, 4, 3, 2, 1, 0.5, 0.1 percent axial variation about the circumference of the piston 20) during operation of the engine 10. In some embodiments, the top annular surface 106 and/or the bottom annular surface 108 may have an axial variation (e.g., an amplitude 111 between a top-most peak and a bottom-most trough of the respective surface 106, 108 or respective edges 110, 114, 116, 120 as shown in FIG. 5) about the circumference of the piston 20 at ambient temperatures that is configured to be reduced, such as by approximately 50, 60, 70, 80, 90, or 95 percent, during operation of the engine 10. In some embodiments, the top annular surface 106 and/or the bottom annular surface 108 may have an axial variation (e.g., the amplitude) about the circumference of the piston 20 at ambient temperatures that is configured to be reduced, such as by greater than 50, 60, 70, 80, 90, or 95 percent, during operation of the engine 10.

The top groove 42 may be configured to compensate for any suitable percentage of expected distortion. For example, the top groove 42 may be configured to compensate for approximately 50, 75, 90, 95, 100, or 110 percent of the expected distortion. In some embodiments, the top groove 42 may be configured to compensate for greater than approximately 50, 75, 90, 95, 100, or 110 percent of the expected distortion. Furthermore the top groove 42 may be configured to compensate for expected distortion at any of a variety of suitable operating conditions, such as at idle or at a rated load for the engine 10. As noted above, the distortion compensation is discussed with reference to the top groove 42 to facilitate discussion. However, the features of the top groove 42 discussed herein may additionally or alternatively be applied to the one or more additional grooves 52.

Figure 7:
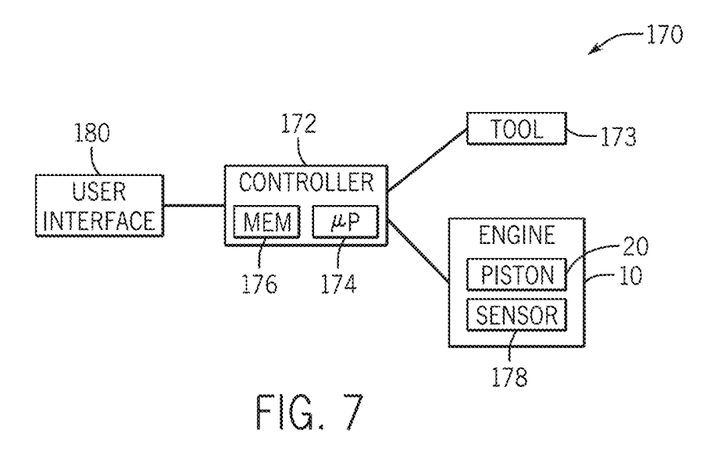
FIG. 7 is a schematic diagram of an embodiment of a system configured to manufacture a piston for use in the reciprocating engine system of FIG. 1.

FIG. 7 is a schematic diagram of an embodiment of a system 170 that is configured to manufacture the piston 20 for use in the engine 10. As shown, the system 170 includes a controller 172 that may be coupled to a tool 173 (e.g., a lathe) configured to machine (e.g., cut or form) the piston 20 for use in the engine 10. In certain embodiments, the system 170 may be configured to determine (e.g., via operational feedback from sensors, cameras, computer simulations, or computer models) distortions (e.g., axial distortions, tilt, or the like) about the circumference of the piston 20 during operation of the engine 10 under various conditions (e.g., idle, a rated load, or a percentage of the rated load). In some embodiments, the system 170 may include a test engine 10 and/or a test piston 20 equipped with sensors and/or one or more cameras. In some embodiments, the system 170 may include a series of thermal sensors, a series of acoustic sensors, and/or one or more cameras positioned about a circumference of the piston 20 that are configured to monitor (e.g., provide signals indicative of) temperatures and/or distortions about the circumference of the piston 20. In some embodiments, the sensors and/or the cameras may enable the system 170 to generate digital images and/or thermal images of the top groove 42 about the circumference of the piston 20, which may facilitate identification of distortions about the top groove 42. In some cases, the system 170 may be configured to determine the appropriate machining parameters to compensate for the determined distortions.

In the illustrated embodiment, the controller 172 includes a processor, such as the illustrated microprocessor 174, and the memory device 176. The controller 172 may also include one or more storage devices and/or other suitable components. The processor 174 may be used to execute software, such as software for controlling the system 170. Moreover, the processor 174 may include multiple microprocessors, one or more "general-purpose" microprocessors, one or more special-purpose microprocessors, and/or one or more application specific integrated circuits (ASICS), or some combination thereof. For example, the processor 174 may include one or more reduced instruction set (RISC) or complex instruction set (CISC) processors.

The memory device 176 may include a volatile memory, such as random access memory (RAM), and/or a nonvolatile memory, such as ROM. The memory device 176 may store a variety of information and may be used for various purposes. For example, the memory device 176 may store processor-executable instructions (e.g., firmware or software) for the processor 174 to execute, such as instructions for controlling the system 170. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., distortion data, machining parameters, or the like), instructions (e.g., software or firmware for controlling the system 170, or the like), and any other suitable data.

In some embodiments, the controller 172 is configured to measure (e.g., based on signals received from one or more sensors 178 or cameras coupled to the piston 20, the cylinder 26, and/or the engine 10) distortion of the top groove 42 about the circumference of the piston 20 during operation of the engine 10. In some embodiments, the controller 172 may be configured to analyze the top groove 42 during operation of the engine 10 to determine the distortion of the top groove 42. For example, the controller 172 may be configured to analyze the top groove 42 based on a computer simulation or a computer model of the piston 20 during operation of the engine 10. In some embodiments, the controller 172 may be configured to determine the distortions of the top groove 42 based on received or accessed data indicative of the distortion of the top groove 42 from another processing or storage device. In some embodiments, the controller 172 may receive inputs indicative of the distortion of the top groove 42 via a user interface 180 or from a sensor or imaging device configured to receive data indicative of distortions. In some embodiments, the controller 172 may be configured to determine the distortions based on finite element analysis (FEA) analysis, such as FEA thermal analysis, or other suitable techniques. For example, the controller 172 may measure, determine, and/or receive data indicative of distortions, such as those shown in a schematic side view of the top groove 42 of FIG. 8. The schematic illustrates an example of baseline distortions of a typical top groove about the circumference of the piston 20 during operation of the engine 10. Inputs related to the operating conditions (e.g., idle or rated load) at which compensation is desired may be input via the user interface 180 to enable the controller 172 to determine the distortions under the selected operating conditions of the engine 10. In some embodiments, the distortions of the top groove 42 at multiple different operating conditions may be determined and/or stored in the memory 176 for later use by the controller 172.

Figure 8:
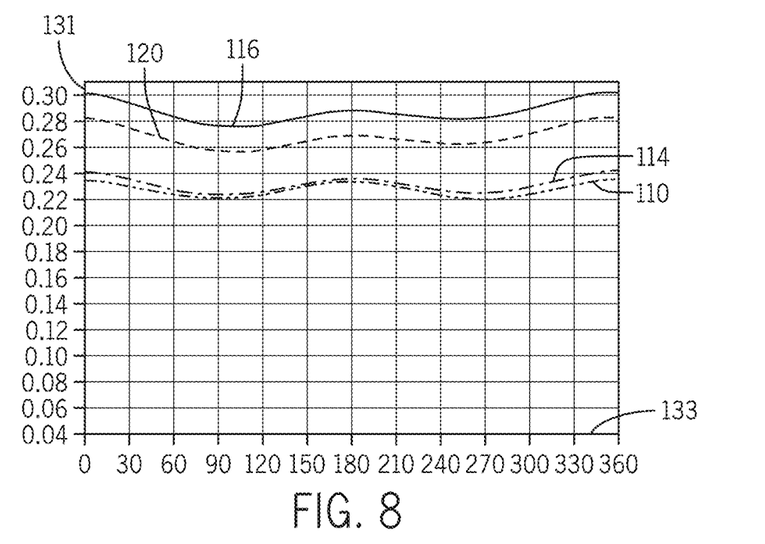
FIG. 8 is a schematic side view of a top annular groove with expected distortions that may be determined by the system of FIG. 7.

In some embodiments, the controller 172 is configured to determine appropriate machining parameters to compensate for the determined distortions about the top groove 42. Inputs related to a desired percentage of compensation (e.g., greater than approximately 50, 75, 95, 100, or 110 percent) may be input via the user interface 180 to enable the controller 172 to determine the appropriate machining parameters. The controller 172 may be configured to control the lathe 173 to form the piston 20 having the top groove 42 according to the machining parameters. Thus, the controller 172 may control the lathe 173 to generate the piston 20 having the top groove 42 having a suitable geometry to compensate for the expected or measured distortions during operation of the engine 10. In some embodiments, the controller 172 may control the lathe 173 such that the top annular face 106 and/or the bottom annular face 108 of the top groove 42 undulate (e.g., oscillate up and down, follow a wave pattern, etc.) about the circumference of the piston 20 at ambient temperatures. For example, the controller 172 may control the lathe 173 to form the top groove 42 as shown in the schematic in FIG. 5 to compensate for the distortions as shown in the schematic of FIG. 8, such that the top groove 42 is substantially flat as shown in the schematic of FIG. 6 during operation of the engine 10. The lathe 173 is utilized in the above example to facilitate discussion, although other techniques (e.g., casting) and/or other machining tools may be utilized to form the top groove 42 having the disclosed configuration.

Figure 9:
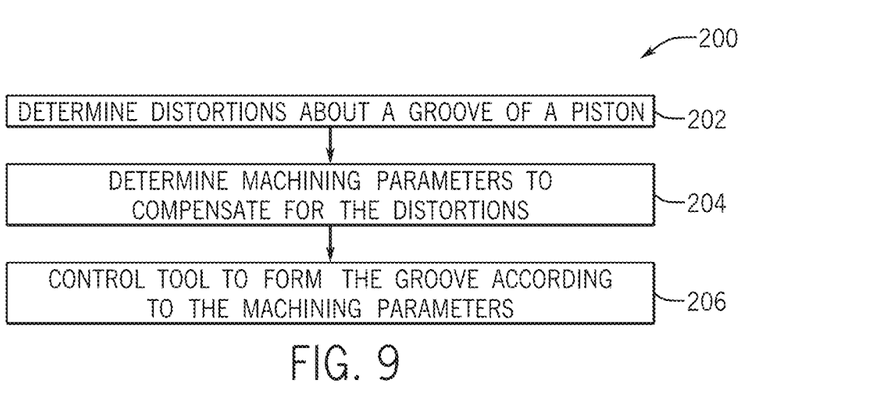
FIG. 9 is a process flow diagram of a method of manufacturing a piston for use in the reciprocating engine system of FIG. 1.

FIG. 9 is a process flow diagram of a method 200 of manufacturing the piston 20. The method 200 includes various steps represented by blocks. Although the flow chart illustrates the steps in a certain sequence, it should be understood that the steps may be performed in any suitable order and certain steps may be carried out simultaneously, where appropriate. In some embodiments, certain steps may be omitted. Further, certain steps or portions of the method 200 may be performed by separate devices.

In step 202, the controller 172 determines expected distortions (e.g., axial distortions, tilt, or the like) of the top groove 42 about the circumference of the piston 20 during operation of the engine 10. The controller 172 may determine the expected distortions by analyzing the top groove 42 during operation of the engine 10. In some embodiments, one or more sensors 178 or imaging device may be utilized to monitor distortions at various circumferential locations of the top groove 42 during operation of the engine 10 at one or more loads (e.g., idle, a rated load, or a certain percentage of the rated load). In such cases, the one or more sensors 178 may provide signals to the controller 172, which may be configured to determine the expected distortions based on the signals. In some embodiments, a computer model or a computer simulation of the top groove 42 of the piston 20 may be generated and analyzed (e.g., by the controller 172) to estimate the expected distortions of the top groove 42 when the engine 10 operates at one or more loads (e.g., idle, a rated load, a certain percentages of the rated load, or the like). In some embodiments, the controller 172 may use FEA analysis, such as FEA thermal analysis, to determine the distortions of the top groove 42.

In some embodiments, the controller 172 may receive or access data indicative of the expected distortion of the top groove 42 from another processing or storage device. In some embodiments, the controller 172 may receive inputs indicative of the distortion of the top groove 42 via a user interface 180. Inputs related to the operating conditions (e.g., idle or rated load) at which compensation is desired may be input via the user interface 180 to enable the controller 172 to determine the distortions under the selected operating conditions of the engine 10. For example, the controller 172 may measure, determine, or receive data indicative of distortions, such as those shown in a schematic side view of the top groove 42 in FIG. 8.

In step 204, the controller 172 may determine appropriate machining parameters to compensate for the expected distortions about the top groove 42. In some embodiments, the controller 172 may determine machining parameters that compensate for approximately 100 percent of the measured distortions about the top groove 42. In certain embodiments, the controller 172 may determine machining parameters that compensate for more than approximately 50, 75, 95, 100, or 110 percent of the measured distortions about the top groove 42. Inputs related to a desired percentage of compensation may be input via the user interface 180 to enable the controller 172 to determine the appropriate machining parameters.

In step 206, the controller 172 may control the tool 73 (e.g., machining tool or lathe) according to the determined machining parameters, thereby generating the piston 20 having the top groove 42 configured to compensate for the expected distortions. For example, the top groove 42 may include compensating undulations about the circumference of the top groove 42, such as those shown in FIG. 5, such that the top annular surface 106 and/or the bottom annular surface 108 are substantially flat during operation of the reciprocating engine 10, as shown in FIG. 6.

Figure 10:
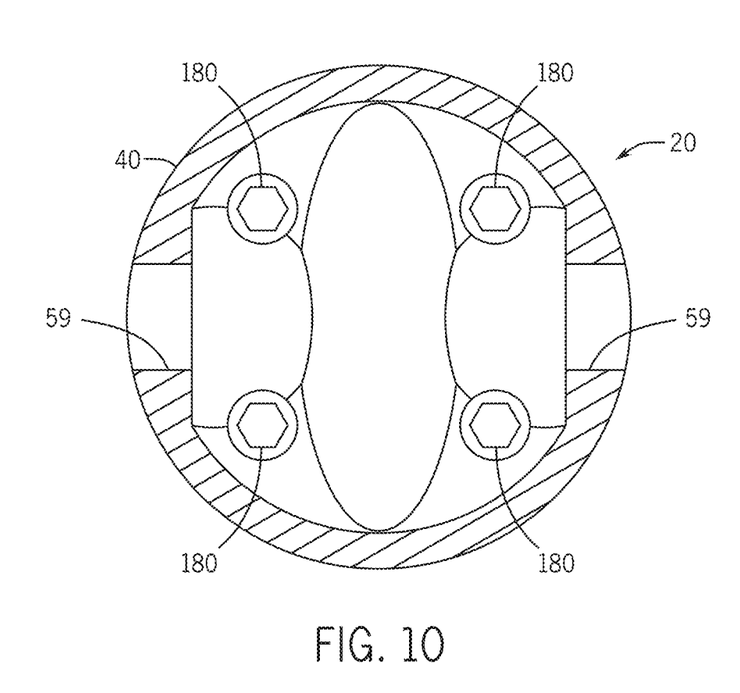
FIG. 10 is a bottom view of a portion of an embodiment of a piston that may be used in the reciprocating engine system of FIG. 1, illustrating a plurality of threaded fasteners.

FIG. 10 is a bottom view of a portion of an embodiment of the piston 20, illustrating a plurality of threaded fasteners 180 configured to couple a top portion of the piston 20 to a bottom portion (e.g., skirt) of the piston 20. In some cases, the top groove 42 may be distorted by various mechanical features of the piston 20, such as the threaded fasteners 180. For example, during assembly, the torque applied to tighten the threaded fasteners may cause distortions at one or more discrete circumferential locations of the top groove 42 (e.g., at one or more discrete locations circumferentially aligned with the threaded fastener). In some embodiments, the top groove 42 may be configured to compensate for such distortions. For example, the top annular surface 106 and/or the bottom annular surface 108 may include an axially-extending features (e.g., a bulge or a recess) at a discrete circumferential location that experiences distortion from tightening of the threaded fasteners 180 during assembly of the piston 20 such that the top annular surface 106 and/or the bottom annular surface 108 are substantially flat during operation of the engine 10. Although four threaded fasteners 180 are shown, the piston 20 may include any suitable number of threaded fasteners 180 (e.g., 1, 2, 3, 4, 5, 6, 7, 8 or more).

The distortions induced by the threaded fasteners 180 may be determined via any suitable techniques, including those discussed above with respect to FIGS. 8 and 9 (e.g., sensors, cameras, computer models, computer simulations, or user input), for example. Additionally, the piston 20 may be machined to compensate for the distortions via any suitable techniques, including those discussed above with respect to FIGS. 8 and 9 (e.g., determining the appropriate machining parameters and/or controlling the tool 173). The distortions discussed herein are exemplary and it should be understood that the disclosed embodiments may be adapted to compensate for any of a variety of distortions to the top groove 42 and/or to the one or more additional grooves 52, including those caused by inertia or firing pressure, for example.

Technical effects of the disclosed embodiments include providing systems configured to compensate for distortions within grooves (e.g., the top groove 42) of the piston 20. For example, temperature variations and/or mechanical features of the piston 20 may cause the top groove 42 to be unevenly distorted about the circumference of the piston 20. The top groove 42 may be machined to have undulations that extend about the circumference of the piston 20 at ambient temperatures to compensate for the distortions experienced during operation of the engine 10. Such compensation may advantageously facilitate contact between the top ring 44 and the inner wall 28 of the cylinder 26, and therefore, may reduce blowby of unburned hydrocarbons, oil consumption, and/or emissions, for example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a piston, comprising:
      a top surface;
      a sidewall disposed about a central axis; and
      a first groove disposed in the sidewall and configured to receive a first piston ring, wherein the first groove comprises a first axially-facing surface having first surface variations that vary unevenly by alternating in opposite directions with an irregular amplitude peak to peak at least partially about a circumference of the piston at an ambient temperature.

2. The system of claim 1, wherein the first surface variations comprise curved surface variations.

3. The system of claim 2, wherein the curved surface variations comprise curved protrusions, curved recesses, or a combination thereof.

4. The system of claim 1, wherein the first surface variations vary unevenly at least in an axial height.

5. The system of claim 1, wherein the first surface variations comprise undulations that vary unevenly at least partially about the circumference of the piston at the ambient temperature.

6. The system of claim 1, wherein the first surface variations substantially flatten in response to thermally induced distortions of the piston during operation of the piston in a cylinder.

7. The system of claim 6, wherein the thermally induced distortions are at least partially caused by heat from combustion in a combustion chamber adjacent the top surface of the piston.

8. The system of claim 1, comprising an engine having the piston.

9. The system of claim 1, wherein the first surface variations vary unevenly in an arrangement generally opposite from distortions expected during operation of the piston in a cylinder.

10. The system of claim 9, wherein the first surface variations comprise a recessed surface variation that extends in a first axial direction opposite from a second axial direction of a first opposing distortion expected during operation of the piston, or a protruding surface variation that extends in the second axial direction opposite from the first axial direction of a second opposing distortion expected during operation of the piston, or a combination thereof.

11. The system of claim 1, wherein the first groove comprises a top groove of the piston.

12. The system of claim 1, wherein the first groove comprises a second axially-facing surface having second surface variations that vary unevenly at least partially about the circumference of the piston at the ambient temperature.

13. The system of claim 1, wherein the piston comprises a second groove disposed in the sidewall and configured to receive a second piston ring, wherein the second groove comprises a second axially-facing surface having second surface variations that vary unevenly at least partially about the circumference of the piston at the ambient temperature.

14. The system of claim 1, wherein the first surface variations vary unevenly, in a circumferential direction at a particular radius, at least partially about the circumference of the piston at the ambient temperature.

15. The system of claim 1, wherein the first surface variations vary unevenly at least in an angle of tilt in a radial direction.

16. The system of claim 1, wherein the surface variations are arranged based on a map of temperature distribution and/or distortions in the piston at an elevated temperature above the ambient temperature during operation of the piston, wherein the surface variations are configured to decrease while opposing and decreasing the distortions at the elevated temperature relative to the ambient temperature.

17. The system of claim 1, comprising:
   a controller configured to control a tool to form the first axially-facing surface in the first groove of the piston, wherein the controller is configured to:
   identify a temperature distribution and/or distortions in the piston at an elevated temperature above the ambient temperature during operation of the piston; and
   arrange the surface variations based on a map of the temperature distribution and/or the distortions in the piston at the elevated temperature above the ambient temperature during operation of the piston, wherein the surface variations decrease while opposing and decreasing the distortions at the elevated temperature relative to the ambient temperature.

18. A system, comprising:
   a controller configured to control a tool to:
   form a first axially-facing surface in a first groove of a piston, wherein the piston comprises a top surface, a sidewall disposed about a central axis, and the first groove disposed in the sidewall and configured to receive a first piston ring, wherein the first axially-facing surface has first surface variations that vary unevenly by alternating in opposite directions with an irregular amplitude peak to peak at least partially about a circumference of the piston at an ambient temperature.

19. A method, comprising:
   forming a first axially-facing surface in a first groove of a piston, wherein the piston comprises a top surface, a sidewall disposed about a central axis, and the first groove disposed in the sidewall and configured to receive a first piston ring, wherein the first axially-facing surface has first surface variations that vary unevenly by alternating in opposite directions with an irregular amplitude peak to peak at least partially about a circumference of the piston at an ambient temperature.

20. The method of claim 19, comprising:
   identifying a temperature distribution and/or distortions in the piston at an elevated temperature above the ambient temperature during operation of the piston; and arranging the surface variations based on a map of the temperature distribution and/or the distortions in the piston at the elevated temperature above the ambient temperature during operation of the piston, wherein the surface variations decrease while opposing and decreasing the distortions at the elevated temperature relative to the ambient temperature.

\* \* \* \* \*